Figure 1:
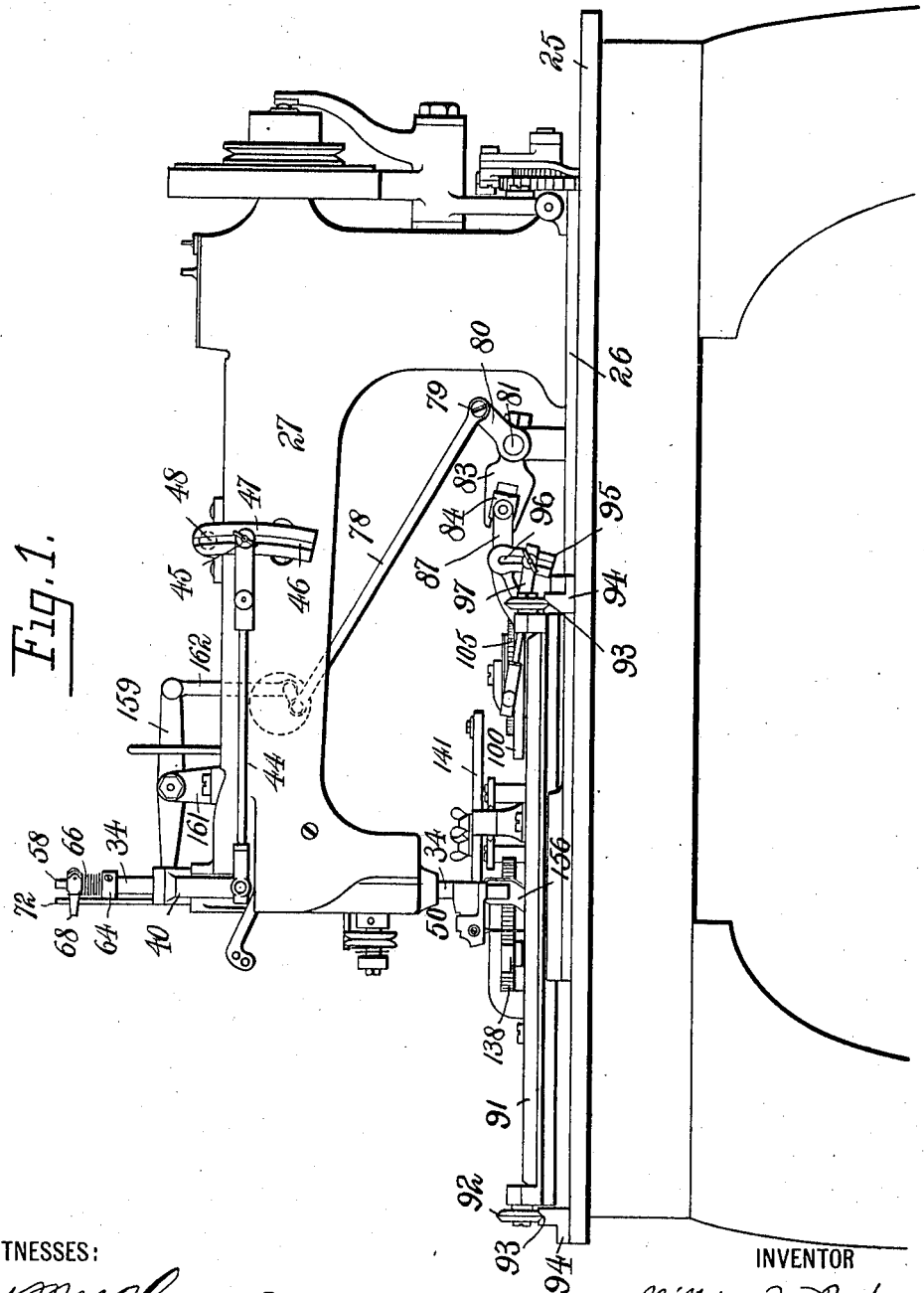

W. N. PARKES.
AUTOMATIC EMBROIDERY MACHINE.
APPLICATION FILED DEC. 30, 1907.

1,027,064.

Patented May 21, 1912.
8 SHEETS—SHEET 1.

WITNESSES:

INVENTOR
William N. Parkes,

W. N. PARKES.
AUTOMATIC EMBROIDERY MACHINE.
APPLICATION FILED DEC. 30, 1907.

1,027,064.

Patented May 21, 1912.
8 SHEETS—SHEET 4.

WITNESSES:

INVENTOR
William N. Parkes.

W. N. PARKES.
AUTOMATIC EMBROIDERY MACHINE.
APPLICATION FILED DEC. 30, 1907.
1,027,064.
Patented May 21, 1912.
8 SHEETS—SHEET 5.
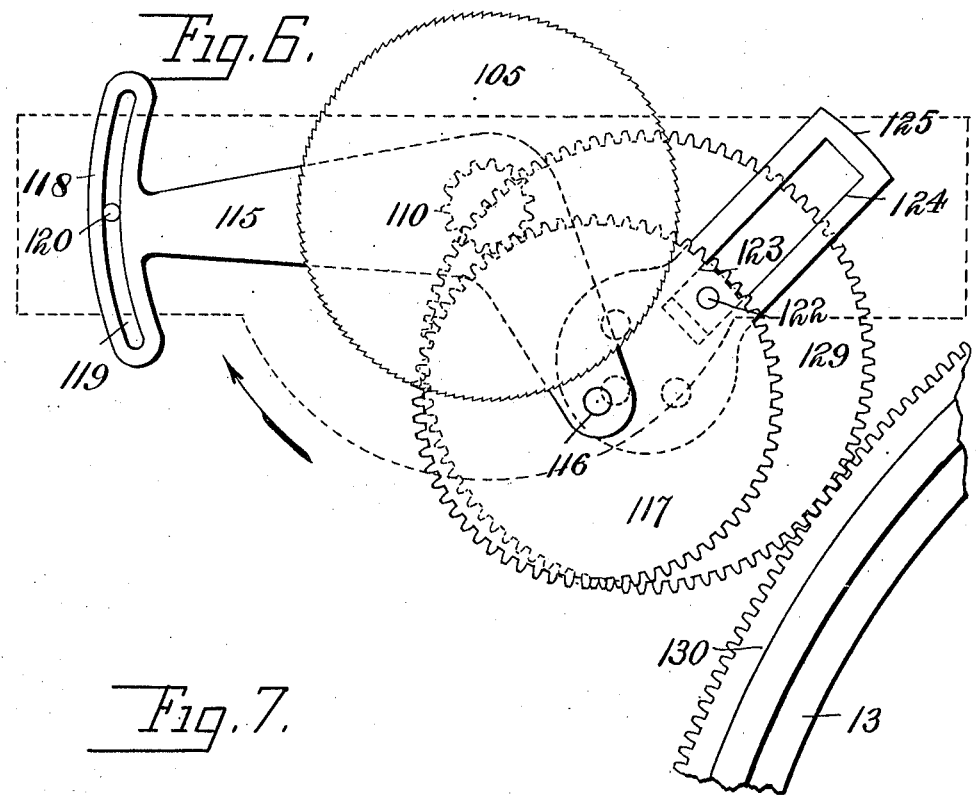
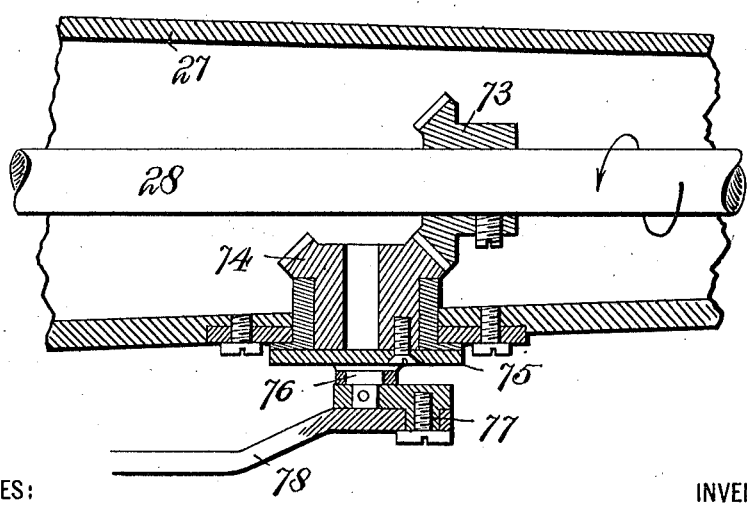
WITNESSES:
INVENTOR
William N. Parkes.

W. N. PARKES.
AUTOMATIC EMBROIDERY MACHINE.
APPLICATION FILED DEC. 30, 1907.
1,027,064.
Patented May 21, 1912.
8 SHEETS—SHEET 6.
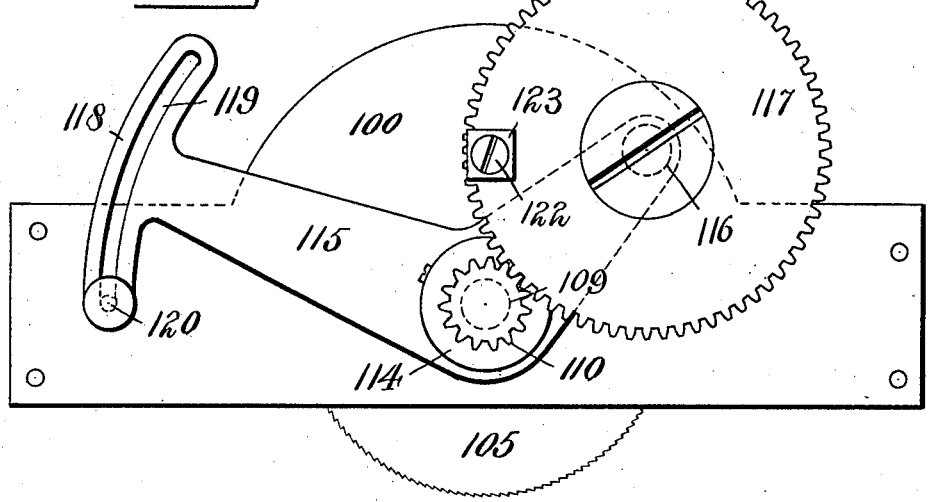
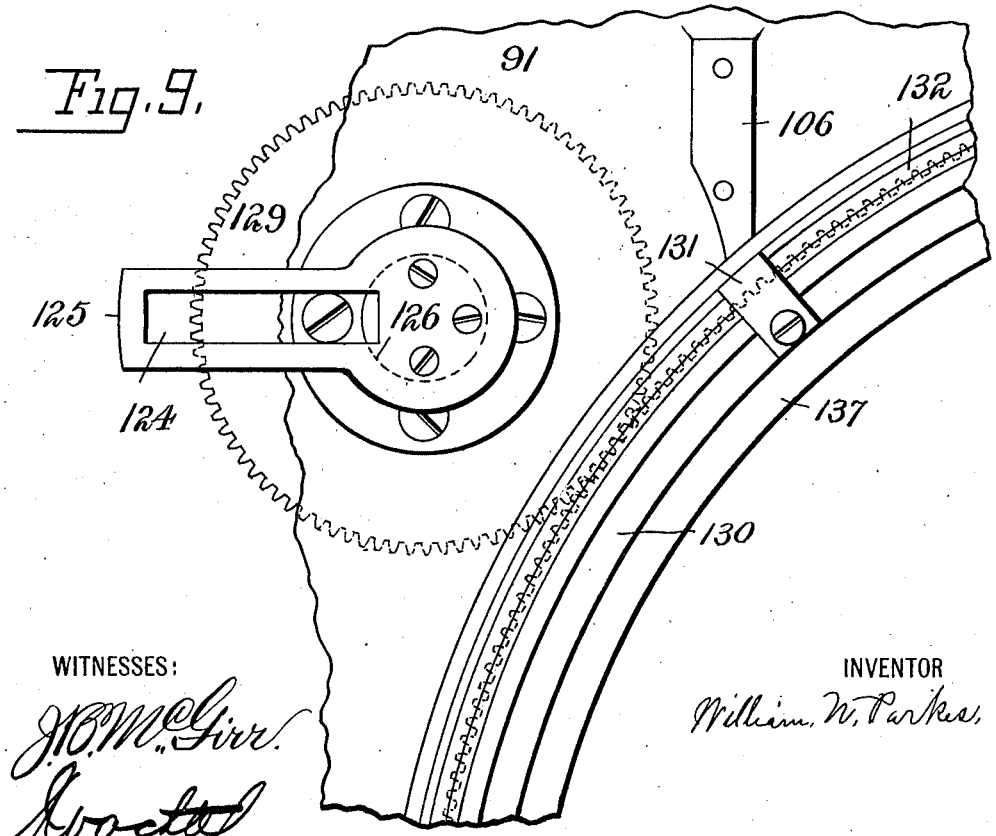
WITNESSES:
INVENTOR
William N. Parkes,

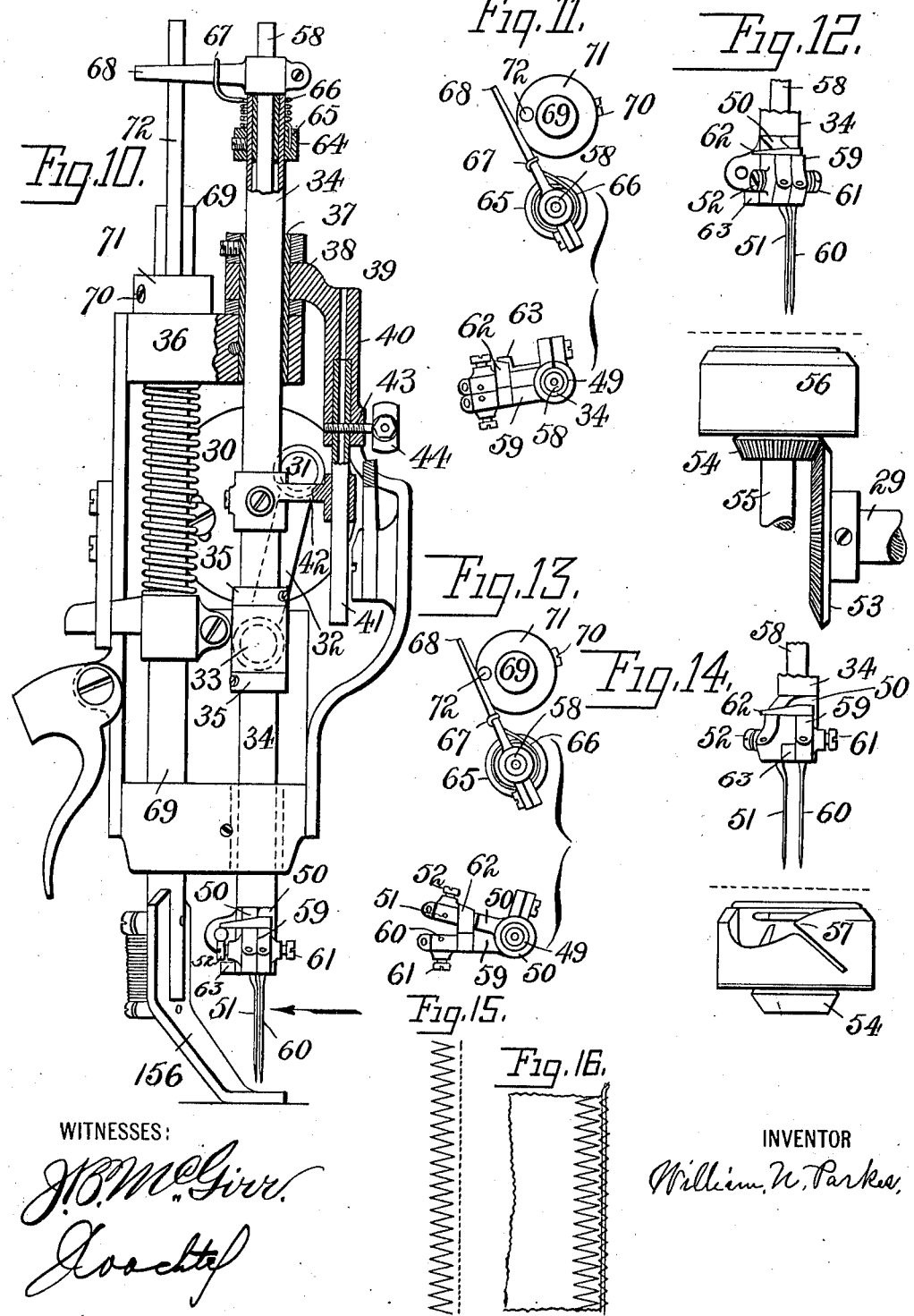

W. N. PARKES.
AUTOMATIC EMBROIDERY MACHINE.
APPLICATION FILED DEC. 30, 1907.

1,027,064.

Patented May 21, 1912.
8 SHEETS—SHEET 8.

WITNESSES:

INVENTOR
William N. Parkes.

UNITED STATES PATENT OFFICE.

WILLIAM N. PARKES, OF BROOKLYN, NEW YORK, ASSIGNOR TO THE PARKES MACHINE COMPANY, OF NEW YORK, N. Y., A CORPORATION OF NEW YORK.

AUTOMATIC EMBROIDERY-MACHINE.

1,027,064. Specification of Letters Patent. Patented May 21, 1912.

Application filed December 30, 1907. Serial No. 408,602.

*To all whom it may concern:*

Be it known that I, WILLIAM N. PARKES, a citizen of the United States, residing in Brooklyn, county of Kings, and State of New York, have invented a new and useful Improvement in Automatic Embroidery-Machines, of which the following is a description.

This invention relates to embroidery or ornamental stitch sewing machines.

One of its main objects is to adapt for use in such machines the stitch forming mechanism shown in Patent #875,617, zigzag or ornamental stitch sewing machine, issued to me December 31, 1907.

It also has for its objects the various improvements in such machines as illustrated in the drawings, and set forth in the specification and claims.

The invention consists mainly of a stitch forming mechanism adapted to make short and long lateral stitches, means for operating it so that short and long lateral stitches are made simultaneously, the long lateral stitches for the interior embroidery, and the short ones for binding stitches along the edge of such interior embroidery and means for disposing such stitches in embroidered designs scalloped or otherwise.

Figure 2:
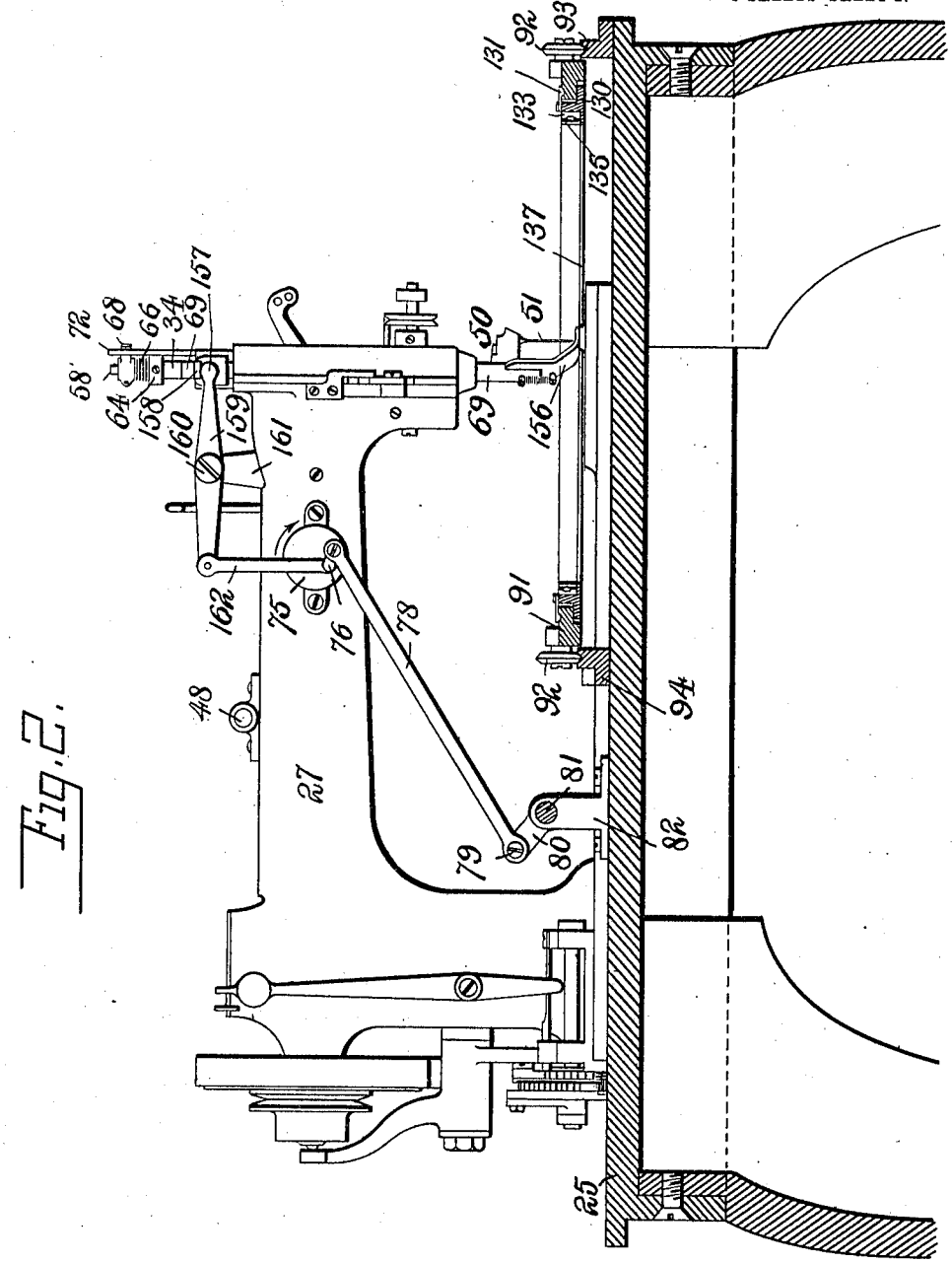
Figure 3:
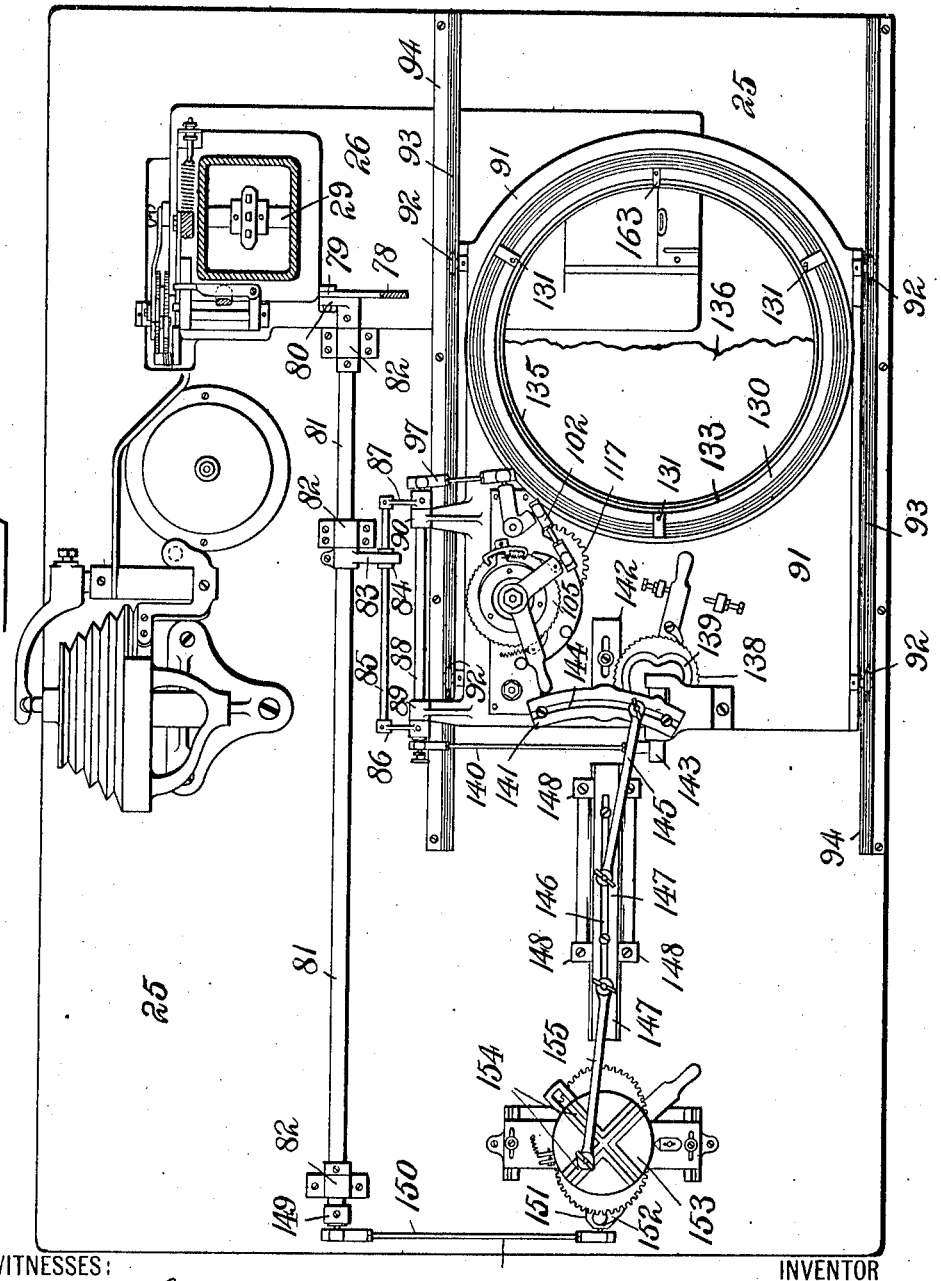
Figure 4:
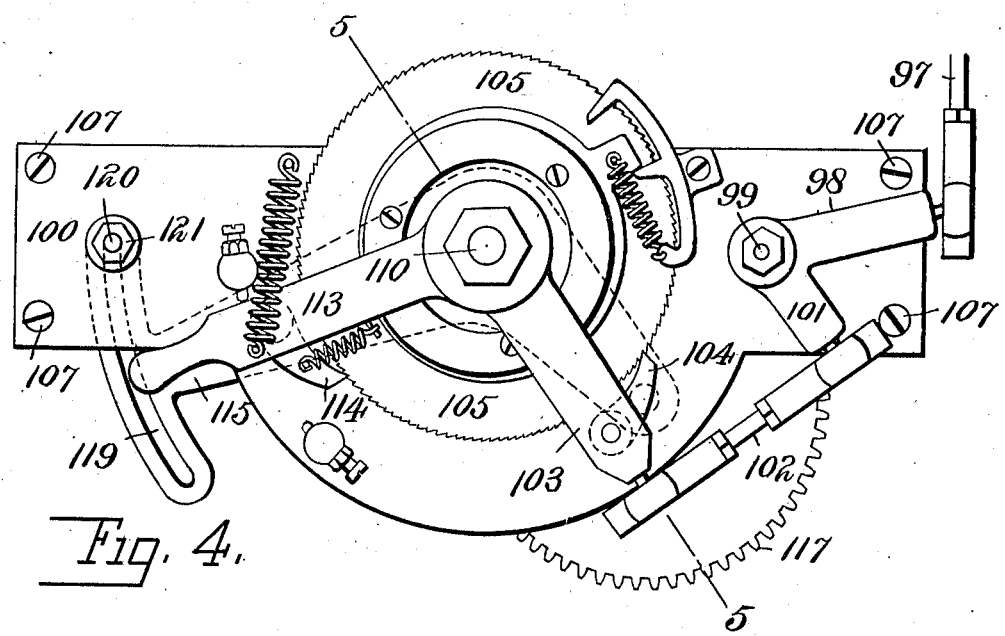
Figure 5:
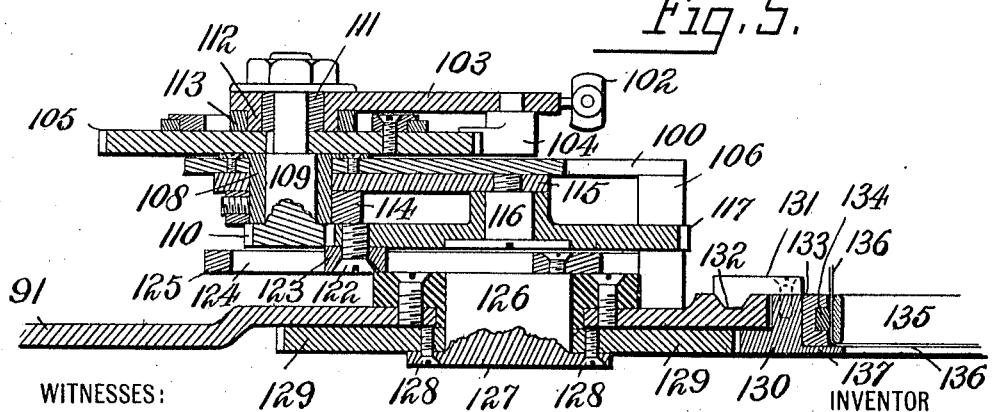

Referring to the drawings: Figure 1 is a front elevation and Fig. 2 is a rear elevation of the machine, some parts being in section. Fig. 3 is a top plan with the overhanging arm omitted. Fig. 4 is a top plan of the work carrier driving mechanism. Fig. 5 is a section on the line 5—5 of Fig. 4. Fig. 6 shows the means by which the speed of rotation of the carrier is varied. Fig. 7 is a section of the means by which the work carrier mechanism is operated. Fig. 8 is a bottom plan of the adjustable lever and its operating parts by means of which the speed of rotation of the work carrier is varied, and Fig. 9 is a top plan of the mechanism directly under the parts of Fig. 8 when such parts are in their operative position as shown in Fig. 4. Fig. 10 shows the face of the overhanging arm, the face plate being removed, and parts in section to disclose the operating parts in connection with the needle bar and presser foot bar. Figs. 11 to 14 inclusive show details in connection with the mechanism for moving the needles laterally. Figs. 15 to 18 inclusive show some of the stitches and designs which may be made with the machine.

In the drawings: 25 is a table which supports the mechanism, 26 the base of the head of the machine, 27 the arm which is secured to the base, 28 a driving shaft from the movement of which by usual means (not shown) the looper shaft 29 is driven. To the forward end of the shaft 28 is secured a disk 30, carrying a crank pin 31, on which is pivoted a link 32, the lower end of which is journaled on a wrist pin extending rearwardly from a part 33, which latter is journaled on a tubular needle bar 34 between collars 35 secured to the bar (see Fig. 10). In a boss 36 is secured a bushing 37 on which is pivoted a horizontally extending end 38 of a lever 39 having a vertically extending part 40. The part 40 carries a rod 41 slidingly connected to an arm 42 carried by the needle bar 34. The lever 39 carries a pin 43 on the end of which is suitably pivoted a pitman 44 adjustably secured by a thumb nut 45 in a way 46 of a lever 47 pivoted at 48. This lever 47 is oscillated in a usual manner by a usual switch cam (not shown) carried by the driving shaft 28. To a reduced part 49 of the needle bar 34 is secured a needle carrier 50 provided with a needle 51 secured by a screw 52 (see Figs. 11 and 12). The needle 51 has an off-set in it that is clearly shown in Figs. 12 and 14. This off-set permits the body of the needle 51, to be brought close to the body of the needle 60 as is clearly seen in Fig. 12. When the machine is operated the needle bar 34 will be reciprocated vertically through the link connection 32 and oscillated on its axis by the lever 47. As the needle 51 is located eccentrically relative to the axis of the needle bar 34, when the bar is oscillated the needle is moved or oscillated laterally.

To the forward end of the shaft 29 (see Fig. 12) is secured a gear 53 meshing with a gear 54 secured to the end of a shaft 55 which is mounted in suitable bearings (not shown). To the top of the gear 54 is secured a hook or looper 56 having a beak 57. This hook is disposed in the machine so that its axis is coincident with the axis about which the needle bar 34 oscillates. The reciprocating path of the needle 51 is close to the path of the beak 57 of the hook 56, and as the axis of the hook and needle bar are coincident the needle 51 moves laterally in a path concentric with the path of the beak of the hook. The gear 54 is one-half the size of the gear 53, therefore the hook 56 is given the usual two rotations to each rotation of the driving shaft of the machine.

By the mechanism so far described the needle may be moved laterally and reciprocated vertically and by the adjustment of the pitman 44 in the way 46 in the lever 47 the extent of the lateral movement of the needle may be varied; or if the end of the pitman 44 is adjusted over the axis 48 of the lever 47, no lateral movement will be transmitted to the needle.

In the needle bar 34 is journaled an auxiliary needle bar 58 which carries a needle holder 59 provided with a needle 60 secured in place by a screw 61. The needle holder 59 is provided with horizontal projections 62 and 63 which embrace the horizontal portion of the needle holder 50 (see Fig. 11). To the upper end of the needle bar 34 is secured a collar 64 in which an end 65 of a coiled spring 66 is located, the other end 67 of this spring being in engagement with an arm 68 carried by the auxiliary needle bar 58 (see Fig. 10). To the upper end of a suitably mounted presser bar 69 is secured, by a screw 70, a collar 71 which carries a pin 72, serving to limit the extent of the oscillatory movement of the auxiliary bar 58 and through it the extent of the lateral movement of the needle 51. For example, when the needle bar 34 is turned on its axis so that the needles move in the direction indicated by the arrow in Fig. 10, both needles will move in unison until the arm 68 contacts with the pin 72 (see Figs. 11 and 13) when further movement of the needle 60 will be arrested without interfering with the continued movement of the needle bar 34 and the needle 51 carried by it. In Fig. 13 is shown the position of these parts after the arm 68 has contacted with the pin 72, and the needle holder 50 has continued to move the needle a greater extent than the needle 60. In Fig. 11 is shown the positions of these parts after the needle holder 50 has in its return movement contacted with the needle holder 59 and moved the same in the opposite direction.

Circular adjustment of the collar 71 carries with it the pin 72 and thereby limits the extent of the lateral movement of the needle 60. For example, this collar may be adjusted so that there will be no lateral movement of the needle 60, and thereby the straight and the zigzag lines of stitching shown in Fig. 15 may be made, or the collar may be adjusted so that the lines of stitching indicated in Fig. 16 will be made. It is thus seen that the extent of the lateral movement of either of the needles may be changed.

To the shaft 28 is secured a bevel gear 73 (see Fig. 7) which meshes with a bevel gear 74, suitably journaled in bearings in the arm of the machine. To the end of the hub of the gear 74 is secured a plate 75 which carries a double crank pin having cranks 76 and 77. On the crank 77 is pivoted one end of a pitman 78 pivotally connected at 79 to an arm 80 carried by a shaft 81 journaled in bearings 82 (see Fig. 3). To the shaft 81 is secured a forked arm 83 which embraces a shoe 84 journaled on a rod 85, secured in arms 86 and 87, which arms are in turn carried by a shaft 88. The shaft 88 is journaled in arms 89 and 90 which project from the work carrier carriage 91. In the operation of these parts the shaft 81 is oscillated, and by this movement the forked arm 83 is oscillated. The forked connection between the arm and the shoe 84 is such that the rod 85 is oscillated bodily about the axis of the shaft 88 and the latter is thereby oscillated on its axis. The prongs of the forked arm 83 are located in grooves formed in the shoe 84. When the work carrier carriage 91 is reciprocated, by means which will be presently described, the shaft 88 and the rod 85 are carried with it, but the shoe 84 remains in its operating engagement with the prongs of the arm 83, and the rod 85 slides through the shoe. It is thus seen that by these parts an operative connection may be maintained between the shaft 81, which is located in bearings on the table 25, and the shaft 88 which is carried by the work carrier carriage 91. Thus the work carrier carriage may be reciprocated without interfering with the operation of the mechanism carried by it.

The work carrier 91 is provided with wheels 92 running in grooves 93 formed in a track 94 carried by the table 25. To the end of the shaft 88 is secured an arm 95 (see Fig. 1) having a way 96 in which is adjustably connected an end of a pitman 97 which, at its other end (see Fig. 4) is pivoted to a lever, which latter is pivoted at 99 on a plate 100. To the end 101 of the lever 98 is pivoted a pitman 102 connected to a pawl lever 103 carrying a pawl 104 engaging the teeth of a ratchet wheel 105. The plate 100 is secured to abutments 106 (only one of which is shown) by means of screws 107. In the plate 100 is secured a bushing 108 (see Fig. 5) in which is journaled a hub 109 of a gear wheel 110. To the upper reduced portion of the hub 109 is secured the ratchet wheel 105. A sleeve 111 is mounted on the reduced portion of the hub 109 above the ratchet wheel and on this sleeve is pivoted the pawl lever 103 provided with a reduced portion 112 on which is pivoted a second pawl lever 113 provided with a pawl 114 engaging the teeth of the ratchet 105. On the bushing 108, just above the gear 110, is a collar 114, between which and the plate 100 on the bushing 108 is pivoted a bell crank lever 115 carrying a stud 116 on which is journaled a gear wheel 117 meshing with the gear 110. The end 118 of the bell crank lever 115 is T shaped and provided with a slot 119 concentric with the axis of the gear 110. Through this slot passes a bolt 120 provided with a lock nut 121 by means of which the bell crank lever 115 is secured to the plate 100. To the gear 117 is pivotally secured, by a screw 122 (see Figs. 5 and 6) a shoe 123 adapted to operate in a slide 124 formed in an arm 125 carried by a shaft 126 having a head 127 to which is secured, by means of screws 128, a gear wheel 129, located under the work carrier carriage 91. The gear 129 meshes with the teeth of a work carrier rack 130 provided with bearing pieces 131 which run in a circular groove 132 formed in the work carrier carriage 91 (see Figs. 5 and 9). A clamping ring 133 provided with flexible material such as rubber 134, and a clamping ring 135 serve as means for clamping the work 136 (see Figs. 3 and 5). The work carrier clamping ring rests on an internal annular flange 137 of the work carrier rack 130.

When the machine is operated, the ratchet 105 will be revolved and, through the connection between it and the work carrier rack 130, the work will be revolved. By referring to Fig. 6, it will be seen that by adjusting the lever 115 around on its axis the gear 117 may be adjusted concentric with the axis of the gear 110 without disturbing the operative connections between them. This adjustable driving device is for the purpose of automatically increasing and decreasing the speed of rotation of the work carrier. When the T shaped end of the lever 115 is adjusted in the direction of the arrow in Fig. 6 the shoe 123 carried by the gear 117 will move along a path which is eccentric relative to the axis of the gear 129 so that, under a constant speed in the rotation of the ratchet wheel 105, the speed of rotation of the gear 129 will be varied. When these parts are relatively arranged as shown in Fig. 6 the speed of the gear 129 is substantially at its maximum and when the arm 125 moves one-half around from the position shown in Fig. 6, the speed of the gear 129 will be at its minimum.

On the work carrier carriage 91 is suitably mounted to turn a ratchet wheel 138 provided with a cam 139 (see Fig. 3). This wheel is revolved by a pitman connection 140 between an arm carried by the oscillating shaft 88 and a pawl lever (not shown) which carries a pawl (not shown) which engages the teeth of the ratchet wheel 138 in a manner shown in Fig. 13 of my former Patent 875,626, issued December 21, 1907. The cam 139 is a grooved cam of usual construction cut in the side of the ratchet wheel 138, and the toothed ratchet wheel is operated in a usual manner, by the pawl, which latter is of usual construction, and engages the teeth of the ratchet in a usual manner. A lever 141 pivoted between its ends in a bracket 142, carried by the work carrier carriage 91, is oscillated by a slide 143 which carries an antifriction roll (not shown) which is engaged by the cam 139 and by means of which the slide 143 is reciprocated, suitable means being provided for oscillating the lever 141 from the reciprocating slide 143. The lever 141 is provided with a way 144 in which is adjustably connected one end of a bar 145 which at its other end is secured in a way 146 formed in a slide 147 located to slide between bearings 148. To the outer end of the oscillating shaft 81 is secured an arm 149 in which is adjustably connected, in a usual manner, one end of a rod 150 that is pivotally connected to a pawl lever 151 provided with a pawl 152 engaging a ratchet wheel (not shown). From the movement of this ratchet wheel a disk 153 provided with ways 154, is revolved. A pitman 155 connects the revolving disk 153 to the reciprocating slide 147. The bearings in which this slide reciprocates are secured to the table 25 of the machine and the mechanism operated by the action of the pawl 152, including the disk 153, are also mounted on the same table.

The presser bar 69 is provided with a presser foot 156, (see Figs. 2 and 10) and at its upper end is secured a part 157 provided with a horizontal projection 158 which is engaged by a lever 159 pivoted at 160 on a bracket 161 secured in any suitable manner to the arm of the machine. A pitman 162 connects the lever 159 with the crank pin 76. When the disk 75 revolves the lever 159 will be oscillated and the presser foot thereby lifted. These parts are so located and timed that the presser bar is lifted just previous to the commencement of the movement of the work and it again goes into engagement with the work just previous to loop engagement between the needle thread and the looper.

In the operation of the machine the work 136 is clamped between the rings 133 and 135 and these rings are placed in the work carrier rack 130. A catch 163 (see Fig. 3) carried by the rack 130 is located in a notch formed in the top of the work clamping rings, thereby serving as a means for turning these rings positively with the work carrier rack.

If it is desired to make scallops such as are indicated at 164 (see Fig. 18) under a uniform rotation of the work carrier, the following adjustments are made: The lever 115 is adjusted so that the axis of the gear 117 is concentric with that of the gear 129, when the work carrier rack will be rotated at a uniform speed from the movement of the ratchet 105. The end of the pitman 150 is adjusted away from the axis of the oscillating shaft 151 so that the mechanism which operates the disk 153, will be at rest. The pitman 140 is adjusted so as to give the ratchet 138 the desired rotation and, through the movement of the cam 139, the lever 141 an oscillatory movement. The end of the bar 145 is adjusted away from the axis of the lever 141 a sufficient extent to give the desired reciprocating movement to the work carrier carriage 91. Under these adjustments the work carrier will be revolved and through the action of the cam 139 it will also be reciprocated and thus a round piece may be embroidered with scallops. In making such a design, which is generally used for the edge of doilies and the like, the lateral movement of the needle bar is adjusted so that one needle will make the long lateral stitches and the other will make the short lateral stitches, so as to bind and to give a purled effect along the extreme edge of the scallops. The presser foot 156 may carry any suitable means for guiding a filling 165 under the long lateral stitches and a second filling 166 under the short lateral stitches so as to give the embroidered design a raised effect, such for instance as that shown in Fig. 40 of my patent before referred to, No. 875,626, issued December 31, 1907. If it is desired to make the inverted scallop indicated by 167 Fig. 18, the bar 145 is adjusted in the way 144 to the opposite side of the axis of the lever 141.

Figure 17:
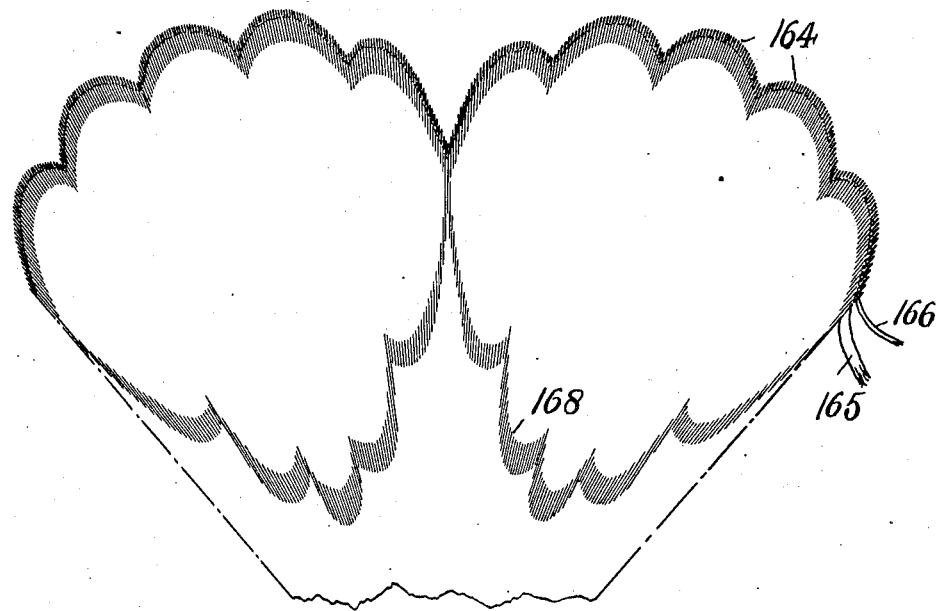
Figure 18:
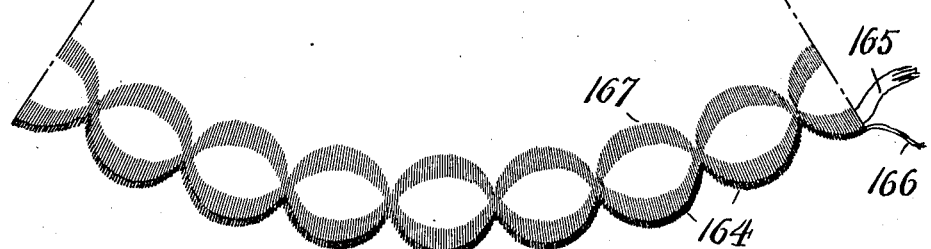

In order to make a compound scallop, such as is shown in Fig. 17, for example, the pitman 151 is adjusted to operate the mechanism which revolves the disk 153 and this mechanism is revolved at a much slower rate of speed than the ratchet wheel 138. For example, in Fig. 17, there are five of the small scallops 164 made on the larger compound scallops; therefore, to make these scallops, the cam 139 is revolved five times to one revolution of the disk 153. If it is desired to make the inverted scallops 168, shown in Fig. 17, the bar 145 is adjusted to the opposite side of the axis of the lever 141 and the connection 155 is adjusted to the opposite side of the axis of the disk 133.

The work carrier being revolved by a ratchet mechanism operated by a ratchet 105, and reciprocated by a second mechanism operated by a ratchet 138, and its reciprocating position being changed by the rotation of the disk 153 which is also operated by a ratchet wheel, (not shown), and the extent of the strokes of the actuating pawls by means of which these ratchets are operated being under adjustment, as has been described, it will be understood that the speed of these various rotating parts may be changed relative to each other, and the embroidered design stitched be thereby varied. And as these ratchet operated mechanisms are mounted so they revolve independently of each other it will be understood that their angular positions relative to each other may be changed and that this will also vary the design being embroidered. By adjusting the end of the rod 145 along in the way 146 of the slide 147 the working position of the work carrier may be adjusted laterally relative to the needle.

Having described the preferred form of my invention what I claim as new is—

1. In a sewing machine, a stitch moving mechanism comprising a plurality of reciprocating needles adapted to be moved laterally, means for moving said needles laterally so as to make long lateral stitches and short lateral stitches along the edge of the path of said long stitches, means in combination therewith for automatically moving the work so as to dispose said stitches in embroidered or scalloped designs, a presser foot, and means for automatically moving said presser foot into and out of engagement with the work.

2. In combination in a sewing machine, a work moving mechanism comprising a circularly moving work holder, a stitch forming mechanism comprising a plurality of reciprocating needles, means for producing between said needles relative lateral movements of different extents, a presser foot, and means for automatically moving said presser foot into and out of engagement with the work.

3. In combination in a sewing machine, a revolving work holder, two reciprocating needles, means for automatically producing a relative lateral movement between one of said needles and the work holder of a predetermined extent, means for producing a relative lateral movement between the other of said needles and the work holder of a different predetermined extent, a presser foot, and means for automatically moving said presser foot into and out of engagement with the work.

4. In combination in a sewing machine, a revolving and reciprocating work holder, two reciprocating needles, means for moving said needles laterally, means for moving one of said needles laterally a greater extent than the other, means for guiding a filling material under the long lateral stitches, means for guiding a filling material under the short lateral stitches, a presser foot, and means for automatically moving said presser foot into and out of engagement with the work.

5. In combination in an automatic embroidery machine, a plurality of reciprocating needles, means for moving laterally one of said needles only, a work moving mechanism including means for moving the work forward and laterally adapted to coöperate with said needles, a presser foot, and means for automatically moving said presser foot into and out of engagement with the work.

6. In a sewing machine, a stitch forming mechanism comprising two reciprocating needles, an off set in one of said needles, means for moving said needles laterally, means for moving one of said needles laterally a greater extent than the other, and a work moving mechanism adapted to coöperate with said needles.

7. In combination in a sewing machine, a work moving mechanism comprising means for revolving the work, means for automatically varying the speed of such movement of the work, a stitch forming mechanism having a plurality of reciprocating and laterally vibrating needles adapted to coöperate with said work moving mechanism, a presser foot, and means for automatically moving said presser foot in and out of engagement with the work.

8. In combination in a sewing machine, a stitch forming mechanism comprising a plurality of vertically reciprocating needles adapted to be moved laterally, means for simultaneously moving said needles laterally different extents with respect to each other, means for automatically moving the work substantially at right angles to the direction in which said needles are moved laterally, means for automatically moving the work in substantially the same direction in which said needles are moved laterally, a presser foot, and means for automatically moving said presser foot into and out of engagement with the work.

In testimony whereof I have hereunto signed my name in the presence of two subscribing witnesses.

WILLIAM N. PARKES.

Witnesses:
J. B. McGirr,
J. Coachte.

Copies of this patent may be obtained for five cents each, by addressing the "Commissioner of Patents, Washington, D. C."